Dec. 6, 1949　　　L. C. WEATHERS　　　2,490,181
ALTERNATING CURRENT MACHINE
Filed Nov. 18, 1946　　　2 Sheets-Sheet 1

INVENTOR.
LELAND CLAY WEATHERS
BY Bacon + Thomas
attys.

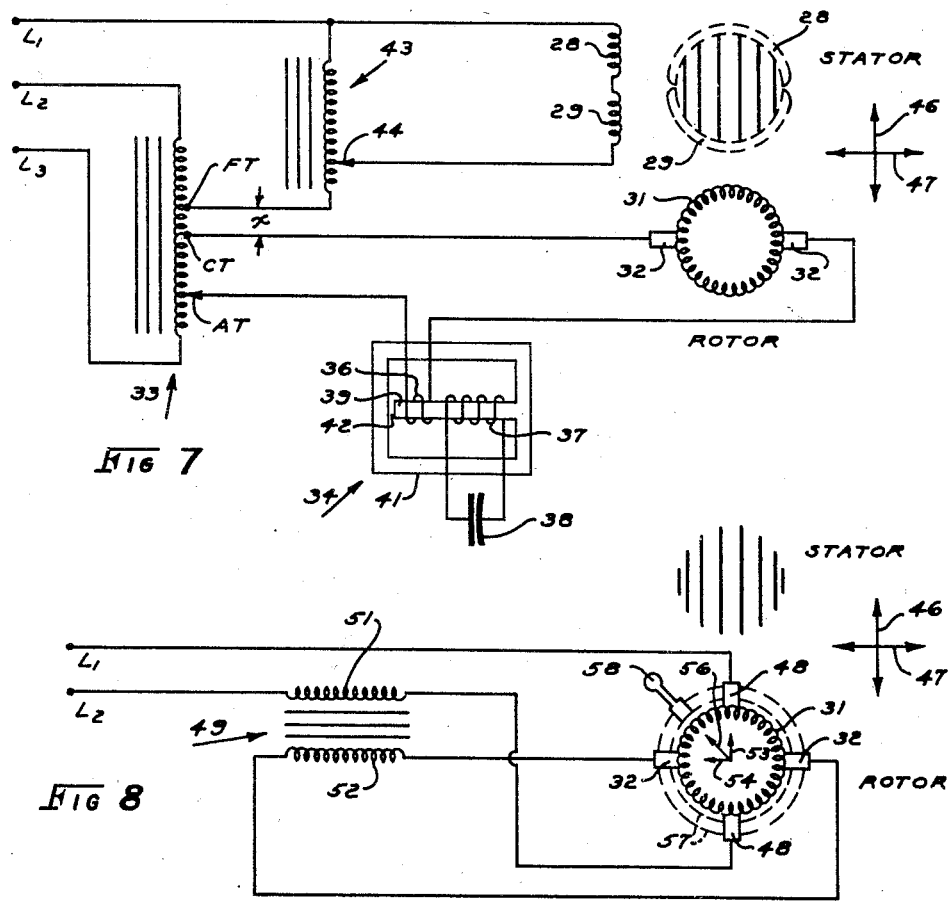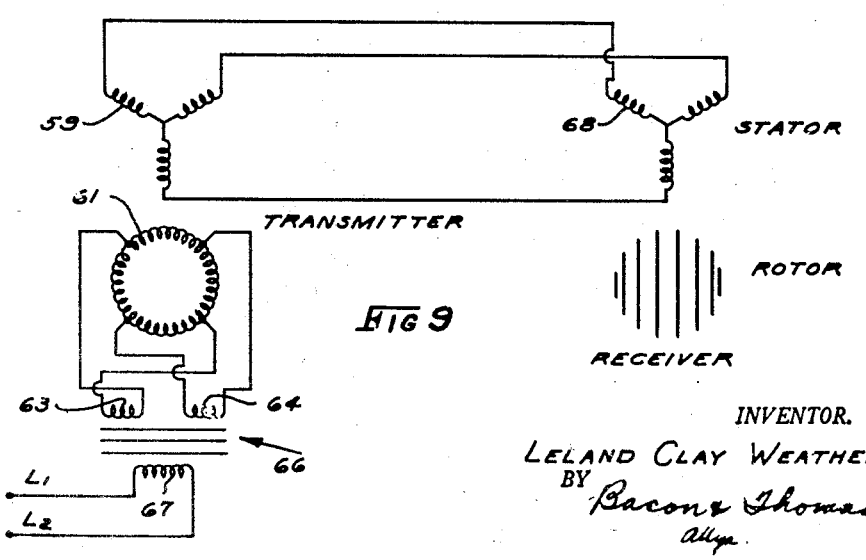

Patented Dec. 6, 1949

2,490,181

UNITED STATES PATENT OFFICE 2,490,181

ALTERNATING CURRENT MACHINE

Leland Clay Weathers, Detroit, Mich., assignor to Vickers Incorporated, Detroit, Mich., a corporation of Michigan Application November 18, 1946, Serial No. 710,644

10 Claims. (Cl. 172—120)

This invention relates to power transmission, and more particularly, to a low impedance bar winding for alternating current dynamoelectric machines which is short circuited in one electrical axis of the machines.

The winding of the present invention is applicable to many types of alternating current machines, including asynchronous motors and generators, self-synchronous machines, etc. Since the winding is of low impedance and is short circuited in one electrical axis of the machine, substantially all of the mutual or air gap alternating flux is directed into or confined to the other electrical axis of the machine. This action can be employed for various purposes, for example, to aid in commutation of alternating current commutator type machines and also to produce or increase torque in certain types of machines due to interaction between power currents in a winding of the machine with the directed air gap flux. The winding of the present invention may be applied to either the stator or the rotor and may be considered a "polarized" winding in the sense that definite poles are produced in the iron of the member to which the winding is applied, even though the iron of such member has no salient poles and no excitation winding is present thereon. Such poles, however, alternate magnetically at the frequency of the excitation power whether the excitation is supplied to another winding on the same member or on another member of the machine.

It is therefore an object of the present invention to provide an improved low impedance winding for alternating current dynamoelectric machines which is short circuited in one electrical axis of the machine.

Another object of the invention is to provide a low impedance winding for alternating current dynamoelectric machines which confines substantially all of the air gap flux to one electrical axis of the machine.

A further object of this invention is to provide a bar winding which is applicable to either the stator or rotor of an alternating current dynamoelectric machine and which is short circuited in one electrical axis of the machine.

A still further object of the present invention is to provide a low impedance winding for either member of a dynamoelectric machine which is made of U-bar elements having their legs positioned in parallel planes in one electrical axis of the machine.

Further objects and advantages of the invention will appear from the following description of preferred embodiments shown in the attached drawings in which:

Figure 7 is a schematic diagram of an alternating current shunt motor employing a stator winding in accordance with the present invention;

Figure 8 is a diagram similar to Figure 7 showing an alternating current motor having series characteristics and employing a stator winding in accordance with the present invention; and Figure 9 is a diagram similar to Figure 7 illustrating a self-synchronous system in which the receiver has a rotor winding in accordance with the present invention.

Figure 1:
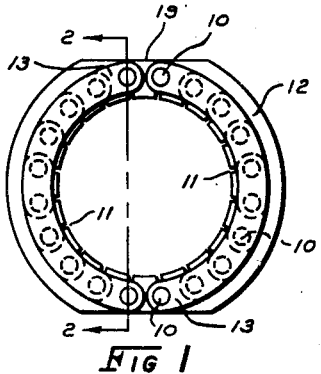
Figure 1 is an end elevation of a stator winding in accordance with the present invention.
Figure 2:
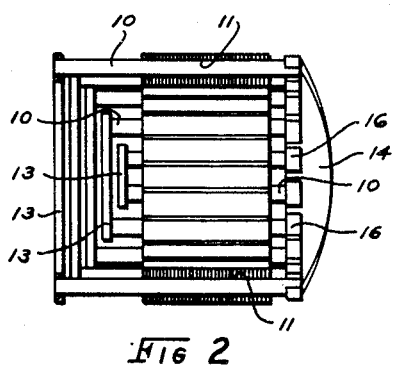
Figure 2 is a vertical longitudinal section taken on the line 2—2 of Figure 1.

Referring more particularly to the drawings, the winding of Figures 1 and 2 may include a plurality of conducting bars 10 extending through partially closed slots 11 in a laminated stator iron structure 12. The bars 10 may be of varying length, as shown in Figure 2, and at one end of the stator pairs of the bars 10 may be connected together by arcuate connecting elements 13 so that the pairs of interconnected bars form the legs of U-bar elements. For the two-pole motor shown in Figures 1 and 2, two sets of U-bar elements are thereby provided in which the two legs of each of the various U-bar elements define a plane parallel to the mechanical axis of the machine and to each other.

Figure 3:
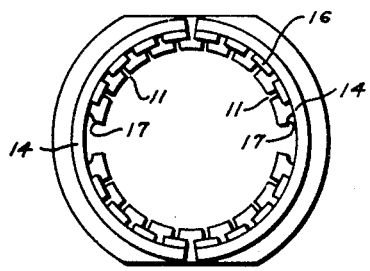
Figure 3 is an end elevation of a slightly modified stator showing the end opposite that of Figure 1.

At the opposite end of the stator all the bars may be connected together by short circuiting conducting elements 14. For example, the ends 16 of the bars 10 may be somewhat flattened, as shown most clearly in Figure 3, and secured to the short circuiting elements 14 in any suitable manner, such as soldering, brazing or welding. Two separate short circuiting elements 14 are shown in Figures 2 and 3 although it is apparent that a single element 14 extending completely around the stator may be employed without changing the electrical effect of the short circuiting elements 14. Such a structure is shown in the rotor winding of Figure 6, as hereinafter described. Since the short circuiting elements 14 are ordinarily of relatively heavy construction, it is in general preferable in stator windings to use a separate short circuiting element 14 for each set of U-bar elements as a substantial saving in copper or other conductor material is accomplished thereby. The short circuiting elements 14 are also preferably of smaller cross-section at their ends than at their mid-portions, as shown in Figure 2, as the short circuit current flowing in these elements is greater adjacent the center of the elements.

Figure 3 shows a structure which is somewhat modified from that of Figures 1 and 2 in that two of the bars 10 having the shortest connecting element 13 have been omitted and a portion of the stator iron cut away to provide enlarged slots 17. These enlarged slots 17 may be employed to receive excitation windings in certain types of dynamoelectric machines, for example, the machine shown in Figure 7 and described in more detail below.

Figure 4:
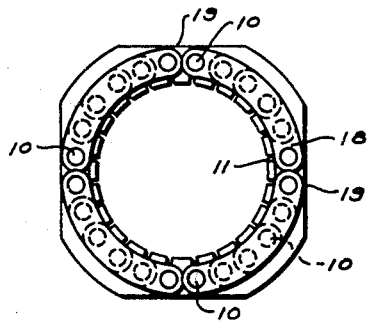
Figure 4 is a view similar to Figure 1 showing a four-pole winding.

The windings of Figures 1 to 3, inclusive, are two-pole windings, but the same type of winding can be provided for any number of pairs of poles, a four-pole winding being shown in Figure 4. In Figure 4, bars 10 are positioned in partially closed slots 11 and the connecting elements 18 are shorter than the connecting elements 13 of Figures 1 and 2 to provide four sets of U-bar elements, i. e., a number of sets equal to the number of poles. Again, each of the U-bar elements in each set have their legs positioned in planes parallel to the mechanical axis of the machine and to the planes of the other U-bar elements in the same set. Even if the windings of Figures 1 to 4 are given the conventional skew employed in many machines, the legs of the various U-bar elements are positioned substantially in the parallel planes discussed above. In all cases the air gap flux leaving the stator through any U-bar elements must be substantially equal to the air gap flux entering the stator through such U-bar element. That is, substantially all of the air gap flux is confined to one electrical axis of the machine, since any flux in the other electrical axis induces voltages in the U-bar windings which produces a current opposing such flux. It follows that poles are produced in the stator iron at an electrical angle of 90° from the electrical axes of the various sets of U-bar elements and since the flux in the portion of the stator iron adjacent the poles is much less than that in other portions of the iron, considerable stator iron or weight can be saved by cutting away the stator iron adjacent the poles, for example at 19 in Figures 1 and 4.

Figure 5:
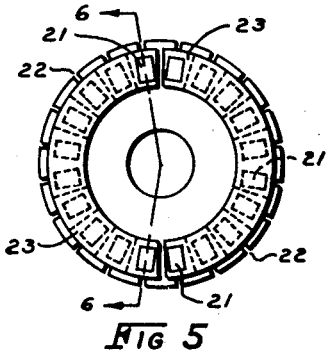
Figure 5 is an end elevation of a rotor winding.
Figure 6:
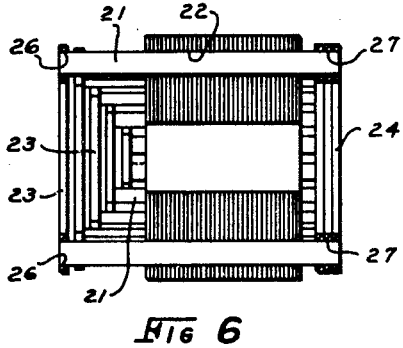
Figure 6 is a substantially vertical longitudinal section taken on the line 6—6 of Figure 5.

The winding of Figures 5 and 6 is similar to the windings of Figures 1 and 2 except that it is applied to a rotor. In the winding of Figures 5 and 6, a plurality of bars of conducting material 21 are preferably positioned in partially closed slots 22 in the rotor and again, pairs of these bars are connected together at one end of the rotor by connecting elements 23. The bars are all connected together by a short circuiting ring 24 at the other end of the rotor, the ring 24 preferably being made up of a plurality of laminations for ease in fabrication. A preferred method of connecting the bars 21 to the connecting elements 23 is to provide apertures 26 in the connecting elements 23 to receive the ends of the bars 21. Similarly, a preferred method of connecting the bars 21 to the short circuiting ring 24 is to provide apertures 27 in the ring 24 to receive the other ends of the bars 21. Low impedance electrical connections can be produced by soldering, brazing or welding of the contacting surfaces between the bars 21 and the various connecting elements 23 as well as the short circuiting ring 24. Again, each of the U-bar elements thus formed in any set of these U-bar elements has its legs in planes substantially parallel to those of any of the other U-bar elements in the set. Figures 5 and 6 illustrate a two-pole rotor but it is apparent that a rotor having any number of pairs of poles may be provided.

From the above description it will be apparent that the windings of the present invention provide a plurality of sets of separate closed loops of conducting material in which the loops of each set are positioned in parallel planes which are also parallel to the mechanical axis of the machine. In a two-pole motor all of the planes of the closed loops are parallel and a convention showing the ends of such closed loops has been adopted in Figures 7 to 9, inclusive, to indicate the winding of the present invention. In either a two-pole motor or a motor having a greater number of poles the closed conducting loops of each set have the same electrical axis, i. e., they are electrically coaxial.

Figure 7 illustrates one use of the stator winding of Figure 3. In the motor or generator circuit shown in Figure 7 an exciting winding having two coils 28 and 29 may be positioned on the stator, the actual position of these coils being indicated by the dash-dot lines. The rotor of the machine of Figure 7 is in the form of an armature having a closed winding 31 supplied with power current through brushes 32. The motor shown may be supplied from a three-phase source of alternating current power indicated by the lines $L_1$, $L_2$ and $L_3$. Armature power current may be supplied to the brushes 32 from an auto-transformer 33 connected between the lines $L_2$ and $L_3$. One of the brushes may be connected to the center tap CT of the auto-transformer 33 and the other brush to an adjustable tap AT of the auto-transformer through a resonator transformer 34. The resonator transformer may have a primary winding 36 in series with the armature circuit and a secondary winding 37 connected across the terminals of a capacitor 38. Both windings are preferably positioned upon the center leg 39 of the core 41 of the resonator transformer 34 and an air gap 42 is preferably provided in the center leg 39. The transformer 34 is preferably a step-up transformer, i. e., the secondary winding 37 has a greater number of turns than the primary winding 36 and by correct design of the transformer 34, it can be employed with a relatively small capacitor to neutralize the inductive reactance of the entire armature circuit so that the current in the armature circuit remains in phase with the armature circuit applied voltage throughout the speed and load operating ranges of the motor.

The excitation winding coils 28 and 29 may be energized from an auto-transformer 43 connected between the line $L_1$ and the fixed tap FT on the auto-transformer 33, the excitation winding coils 28 and 29 being connected between the line $L_1$ and adjustable tap 44 on the auto-transformer 43. Fixed tap FT is displaced from the center tap CT of the auto-transformer 33 by a distance designated by $x$. By predetermining this distance $x$ and fixing the position of the fixed tap for any given motor, the flux produced by the current in the excitation winding coils 28 and 29 may be brought exactly into time phase with the armature power current and this phase relation is maintained under any conditions of speed and load without further adjustment.

For any given excitation voltage applied to the exciting winding coils 28 and 29, the speed of the motor may be adjusted by moving the adjustable tap AT on the auto-transformer 33. As this tap approaches the center tap the motor will slow down and will stop when the adjustable tap is at the same position as the center tap. Carrying the adjustable tap past the center tap will cause the motor to reverse and speed up in the opposite direction. On the other hand, adjustment of the tap 44 on the auto-transformer 43 will change the speed of the motor for any given setting of the adjustable tap AT on the auto-transformer 33. The greater the voltage across the excitation winding coils 28 and 29, the slower the speed of the motor. Ordinarily, the adjustable tap 44 on the auto-transformer 43 will be placed in maximum excitation position when the adjustable tap AT is moved from its maximum voltage position at either end of the auto-transformer 33 to slow down the motor. In this range of adjustment, the motor operates as a "constant maximum torque" motor, i. e., it will develop substantially the same maximum torque at any speed without overheating. When the position of the adjustable tap AT is such as to produce the highest speed, the adjustable tap 44 on the auto-transformer can be adjusted to decrease the voltage applied across the excitation winding coils 28 and 29 and thus further increase the speed of the motor. In this range, the motor operates as a "constant maximum horsepower" motor, i. e., the motor can develop the same maximum horsepower at any speed without overheating. The motor of Figure 7 thus operates as an alternating current shunt motor and will run at a substantially constant speed at any adjustment of the taps AT and 44, the speed decreasing only slightly as load is applied.

By confining substantially all of the flux in the motor to the excitation axis indicated by the double-arrow 46, no substantial armature reaction tending to rotate the flux in the machine can take place due to flow of power current in the power axis indicated by the double-arrow 47 and this source of commutation trouble is eliminated. As the coils in the armature winding 31 which are undergoing commutation have relatively high transformer voltages induced therein from the mutual flux, the motor of Figure 7 ordinarily requires additional circuits (not shown) for substantially preventing flow of armature coil short circuit currents. The commutation circuits referred to are disclosed in my copending application Serial No. 696,006, filed September 10, 1946, but form no part of the present invention. As also disclosed in said application, the motor of Figure 7 may be adapted for single phase operation with substantially the same operating characteristics.

The motor of Figure 7 produces regenerative braking if the load tends to drive the motor under any speed control setting. For example, moving either of the adjustable taps AT or 44 on the auto-transformers 33 and 43, respectively, rapidly toward a slower speed position when the motor is driving an inertia load will cause power current to flow producing a retarding torque to bring the motor to the new adjusted speed. The machine of Figure 7 will also operate as an asynchronous generator if excited from a source of alternating current to produce output armature voltages at the frequency of the excitation current. In such circuits the resonator transformer may be omitted as the power factor, i. e., the phase relationship between the armature current and armature voltage is set by the load. If the reactance of the load is substantially constant, however, the resnator transformer may be employed to resonate the entire armature circuit including the load.

The stator winding of Figures 1 and 2 may be advantageously employed in a motor such as illustrated in Figure 8, which motor has series characteristics. In the motor of Figure 8 no excitation windings on the stator are employed and excitation is applied to the armature winding 31 from lines $L_1$ and $L_2$ through excitation brushes 48 positioned in the excitation axis of the machine. Power current is supplied to the brushes 32 from a series transformer 49 having a primary winding 51 in series with the excitation circuit and a secondary winding 52 connected across the brushes 32. The series transformer 49 insures that the current flowing between the brushes 32 is substantially equal to and in phase with the current flowing between the brushes 48. In the position of the brushes shown, current flowing between the brushes 48 produces a magnetomotive force indicated by the vector 53 in the excitation axis. Current flowing between the brushes 32 produces a magnetomotive force indicated by the arrow 54 in the power axis and these magnetomotive forces have a resultant indicated by the vector 56. The short circuited stator winding acts in the same manner as a short-circuited transformer secondary winding in the power axis with respect to the armature winding acting as a transformer primary winding so that the armature has low impedance in the power axis. The armature has a much higher impedance in the excitation axis. The actual impedance to flow of current between the lines $L_1$ and $L_2$ is equal to the sum of these two impedances. Torque is produced by interaction between the flux in the excitation axis and the currents in the stator windings, or similarly stated, by interaction between the flux in the excitation axis and the power current flowing in the armature winding 31. This is true as the current flowing in the armature in the power axis is proportional to the current in the stator winding by reason of transformer action between the rotor and stator windings.

As indicated by the dotted line 57, all of the brushes 32 and 48 can be mechanically supported upon a main brush ring and this brush ring may be provided with a handle 58. The brushes 32 and 48 may be simultaneously shifted circumferentially of the rotor and this action will rotate the resultant magnetomotive force 56. When the resultant magnetomotive force 56 is brought into alinement with the excitation axis, no torque is developed in the motor and carrying the resultant magnetomotive force 56 past the excitation axis will cause the motor to reverse and run in the opposite direction. Rotation of the motor causes a speed voltage to be induced in the armature winding in the power axis and this voltage is reflected into the excitation axis by the series transformer to decrease the excitation of the motor. The motor therefore has series motor characteristics. The motor of Figure 8 also requires additional commutation circuits (not shown) to substantially prevent armature coil short circuit currents in the coils undergoing commutation. Such commutation circuits are disclosed and discussed in my copending application Serial No. 696,006, filed September 10, 1946, but form no part of the present invention.

Figure 9 illustrates the employment of a rotor winding such as is shown in Figures 5 and 6. In this figure, a self-synchronous transmitter may have a phase-wound winding 59 on the stator thereof, the rotor having an energizing winding 61. The transmitter may be of the equal impedance type disclosed in my Patent No. 2,227,471, granted January 7, 1941, in which the rotor winding 61 is energized by quadrature connections from separate secondaries 63 and 64 of a transformer 66 having a primary winding 67 connected to a source of alternating current power indicated by lines $L_1$ and $L_2$, although any suitable type of self-synchronous transmitter may be employed. The receiver may have phase-wound stator windings 68 connected to the windings 59 of the transmitter and the rotor may be similar to that shown in Figures 5 and 6. It will be appreciated that energization of the winding 61 of the transmitter will produce a single phase alternating field in the iron of the transmitter and this field will induce voltages in the coils of the winding 59. Current will flow in these coils and in the winding 58 of the receiver to set up a single phase alternating flux in the iron of the receiver. A torque will be developed in the rotor of the receiver and cause the rotor to turn until the poles in the rotor iron produced by the closed conducting loops aline themselves with the field in the receiver iron. Upon rotating one member of the transmitter with respect to the other, the field will be rotated in such transmitter to similarly rotate the field in the receiver, thus causing the rotor of the receiver to follow the transmitter.

From the above description of the invention, it will be apparent that I have provided a novel type of low impedance winding which has utility in many types of alternating current dynamo-electric machines. This winding has extremely high impedance in one electrical axis and extremely low impedance in another electrical axis in quadrature to the first electrical axis. The winding confines the air gap flux in the machine substantially to the excitation axis and may be employed to improve commutation and other operating characteristics in certain types of commutator machines and to cause torque to be developed in various other types of machines.

While I have disclosed preferred modifications of my invention, it is understood that the details thereof may be varied within the scope of the following claims.

I claim:

1. In an alternating current machine having at least one pair of poles and relatively rotatable iron members having an air gap between said members, at least one of said members having axially extending slots substantially uniformly spaced circumferentially around said member, a low impedance bar winding positioned in said slots of said one member of said machine, said winding providing a plurality of sets of conducting loops each loop of which is closed upon itself, the number of sets of said loops being equal to the number of poles of said machine, each of said sets being made up of a plurality of said conducting loops, said conducting loops of each set being electrically coaxial to short-circuit said winding in one electrical axis only of said machine and confine the air gap flux of said machine to an electrical axis substantially in quadrature to said one axis.

2. In an alternating current machine having at least one pair of poles and relatively rotatable iron members having an air gap between said members, at least one of said members having axially extending slots substantially uniformly spaced circumferentially around said member, a low impedance bar winding positioned in said slots of said one member of said machine, said winding providing a plurality of sets of conducting loops each loop of which is closed upon itself, the number of sets of said loops being equal to the number of poles of said machine, each of said sets being made up of a plurality of said conducting loops, certain of the conducting loops of each set having different pitches, said conducting loops of each set being electrically coaxial to short-circuit said winding in one electrical axis only of said machine and confine the air gap flux of said machine to an electrical axis substantially in quadrature to said one axis.

3. In an alternating current machine having relatively rotatable members at least one of which has circumferentially spaced axially extending slots, low impedance conducting bars positioned in at least certain of said slots, separate connectors electrically independent of each other at one end of said one member for connecting pairs of said bars together to form U-shaped conducting elements arranged in sets in which each set includes a plurality of said U-shaped conducting elements, a connecting structure at the other end of said one member and connected to said bars to short-circuit said U-shaped elements and form closed conducting loops, the closed conducting loops of each of said sets being electrically coaxial, and the number of said sets being equal to the number of poles of said machine.

4. In an alternating current machine having relatively rotatable members at least one of which has circumferentially spaced axially extending slots, low impedance conducting bars positioned in at least certain of said slots, separate arcuate elements electrically independent of each other and of conducting material at one end of said one member for connecting pairs of said bars together to form U-shaped conducting elements arranged in sets in which each set includes a plurality of said U-shaped conducting elements, a connecting structure at the other end of said one member for connecting all of the bars of each set together to short-circuit said U-shaped elements and form closed conducting loops, the closed conducting loops of each of said sets being electrically coaxial, and the number of said sets being equal to the number of poles of said machine.

5. In an alternating current machine having relatively rotatable members at least one of which has circumferentially spaced axially extending slots, low impedance conducting bars positioned in at least certain of said slots, separate arcuate elements electrically independent of each other and of conducting material spaced from each other axially of said machine at one end of said one member for connecting pairs of said bars together to form U-shaped conducting elements arranged in sets in which each set includes a plurality of said U-shaped conducting elements having different circumferential spacings of their conducting bars, a connecting structure at the other end of said one member for connecting all of the bars of each set together to short-circuit said U-shaped elements and form closed conducting loops, the closed conducting loops of each of said sets being electrically coaxial, and the number of said sets being equal to the number of poles of said machine.

6. In an alternating current dynamoelectric machine having relatively rotatable members at least one of which has circumferentially spaced axially extending slots, low impedance conducting bars positioned in said slots, pairs of said bars being electrically connected together independently of other of said bars at one end of said one member to provide sets of bars in which the bars of each connected pair are positioned substantially in a plane parallel to the mechanical axis of said machine, the planes of all of said pairs of bars in the same set being substantially parallel, the bars of each set being connected together at the other end of said one member to provide closed loops of conducting material.

7. In an alternating current machine having relatively rotatable members at least one of which has circumferentially spaced axially extending slots, a low impedance bar winding on said one member comprising a plurality of U-shaped bar elements having their legs positioned in said slots, said U-shaped elements being arranged in sets in which the legs of each U-shaped element are positioned substantially in a plane parallel to the mechanical axis of the machine and the planes of the legs of all of the U-shaped elements of each set are substantially parallel, said U-shaped elements being electrically independent of each other at one end of said one member and the legs of each of said U-bar elements being connected together at the other end of said one member to form conducting loops each of which is closed upon itself.

8. In an alternating current machine having relatively rotatable members at least one of which has circumferentially spaced axially extending slots, a low impedance bar winding on said one member comprising a plurality of U-shaped bar elements having their legs positioned in said slots, said U-shaped elements being arranged in sets in which the legs of each U-shaped element are positioned substantially in a plane parallel to the mechanical axis of the machine and the planes of the legs of all of the U-shaped elements of each set are substantially parallel, said U-shaped elements being electrically independent of each other at one end of said one member and a connecting element at the other end of said one member for connecting together all of the legs of the U-bar elements of each set to form closed conducting loops.

9. In an alternating current machine having relatively rotatable members at least one of which has circumferentially spaced axially extending slots, a low impedance bar winding on said one member comprising a plurality of U-shaped bar elements having their legs positioned in said slots, said U-shaped elements being arranged in sets in which the legs of each U-shaped element are positioned substantially in a plane parallel to the mechanical axis of the machine and the planes of the legs of all of the U-shaped elements of each set are substantially parallel, said U-shaped elements being electrically independent of each other at one end of said one member and a connecting element for each of said sets at the other end of said one member for connecting together all of the legs of the U-bar elements of each set to form closed conducting loops.

10. In an alternating current machine having relatively rotatable members at least one of which has circumferentially spaced axially extending slots, a low impedance bar winding on said one member comprising a plurality of U-shaped bar elements having their legs positioned in said slots, said U-shaped elements being arranged in sets in which the legs of each U-shaped element are positioned substantially in a plane parallel to the mechanical axis of the machine and the planes of the legs of all of the U-shaped elements of each set are substantially parallel, said U-shaped elements being electrically independent of each other at one end of said one member and the legs of each of said U-bar elements being connected together at the other end of said one member to form conducting loops each of which is closed upon itself, the number of said sets of U-bar elements being an even number and the conducting loops of each set being electrically coaxial.

LELAND CLAY WEATHERS.

REFERENCES CITED

The following references are of record in the file of this patent:

UNITED STATES PATENTS

| Number | Name | Date |
|---|---|---|
| 841,257 | Latour | Jan. 15, 1907 |
| 877,017 | Torda | Jan. 21, 1908 |
| 1,477,827 | Hildebrand et al. | Dec. 18, 1923 |
| 2,107,872 | Nisbet | Feb. 8, 1938 |

FOREIGN PATENTS

| Number | Country | Date |
|---|---|---|
| 175,084 | Great Britain | Feb. 16, 1922 |

OTHER REFERENCES

Electrical Engineering, Dawes, vol. II, pages 280–282, McGraw-Hill, New York, 1922.